United States Patent [19]

Russell et al.

[11] Patent Number: 4,828,223
[45] Date of Patent: May 9, 1989

[54] CABLE HANDLING APPARATUS

[75] Inventors: Michael Russell, New Milton, Great Britain; Einar Gjestrum, Sandvika, Norway

[73] Assignee: Geco A.S., Sandvika, Norway

[21] Appl. No.: 105,078

[22] Filed: Oct. 5, 1987

[30] Foreign Application Priority Data

Oct. 3, 1986 [GB] United Kingdom ............... 8623753

[51] Int. Cl.$^4$ .............................................. B66D 1/00
[52] U.S. Cl. .................................... 254/265; 226/172
[58] Field of Search ................. 254/265, 389; 226/172

[56] References Cited

U.S. PATENT DOCUMENTS

| 2,935,178 | 5/1960 | Lütcke | 226/172 |
| 2,981,454 | 4/1961 | Dickinson | 226/172 |
| 3,024,956 | 3/1962 | Gretter | 226/172 X |
| 3,216,636 | 11/1965 | Kothe | 226/172 X |
| 3,610,500 | 10/1971 | Brown | 226/172 |

FOREIGN PATENT DOCUMENTS

| 304156 | 3/1955 | Switzerland | 254/265 |
| 908769 | 10/1962 | United Kingdom | 254/265 |

Primary Examiner—Stuart S. Levy
Assistant Examiner—Katherine Matecki
Attorney, Agent, or Firm—Holman & Stern

[57] ABSTRACT

A cable handling apparatus draws in a cable, such as a seismic streamer, along a generally linear path and feeds the cable to a winch which winds in the cable from the apparatus under constant tension.

19 Claims, 2 Drawing Sheets

CABLE HANDLING APPARATUS

BACKGROUND OF THE INVENTION

1. Field of the Invention

The present invention relates to a cable handling apparatus.

2. Description of the Prior Art

The offshore seismic exploration industry uses cables, generally called streamers, which are towed in the sea behind a ship during seismic surveying of the earth below the sea. The streamer comprises a cable with a number of hydrophones along its length and, in the case of digital streamers, a number of canisters containing electronics for performing digitization, signal repeating, etc. The streamer has a protective jacket or sheath enclosing each cable section between consecutive pairs of canisters. The canisters have generally tubular rigid housings of greater diameter than the interconnecting cable sections.

Streamers are stored on winch drums on board ships. During deployment, the winch unwinds the streamer from the drum so that the streamer can be towed behind the ship. When a survey is complete, the streamer is wound directly onto the winch drum. Thus, the streamer is stored under large tension on the winch drum and the pressure on the inner layers increases as each additional layer is added. This can result in damage to the streamer. For instance, in the case of streamers with canisters, the canisters can damage the comparatively soft jacket of the cable sections.

SUMMARY OF THE INVENTION

According to the invention, there is provided a cable handling apparatus for use with a storage winch, comprising means for moving the cable toward the winch during storage of the cable.

By providing means for moving the cable toward the winch, the winch is relieved of the function of providing the force necessary for the recovery of the cable and is merely required to wind the cable onto a winch drum. The cable may thus be wound in a manner less likely to cause damage to the cable during winding and storage. For instance, the winch may be arranged to apply a constant limited tension, sufficient to ensure correct winding or layering, to the part of the cable between the winch and the apparatus. The cable is therefore less likely to suffer crushing damage on the winch drum.

Preferably the moving means is arranged to move the cable along a generally linear path. It is thus possible to avoid substantial bending of the cable where it is subjected to a force sufficient to ensure recovery, thus reducing the risk of bending damage. The moving means may comprise at least one driven endless element having a substantially linear run for entraining the cable. In a preferred embodiment of the invention, there are two driven endless elements having respective substantially linear runs for entraining there-between the cable. Preferably there is provided means for urging the linear runs toward each other so as to ensure sufficient frictional grip on the cable to move it without slippage.

Preferably the moving means is arranged to accommodate varying cable cross-sections. The apparatus is thus able to handle cables in which the diameter varies, for instance because of the presence of canisters or other discontinuities. In the case where the moving means comprises at least one driven endless element, the substantially linear run may be supported by a plurality of wheels whose endless element supporting surfaces are capable of being displaced. For example, the wheels may carry pneumatic tyres which are arranged to be at least partially deflated in order to accommodate enlarged cable cross-sections. In the case of cables having portions of enlarged cross-sections which are considerably shorter than the length of the substantially linear run, the interiors of the tires may communicate with a common manifold. Thus, air is displaced from tires which are accommodating cable portions of enlarged cross-section into other tires so that a substantially even pressure is maintained along the part of the cable in contact with the substantially linear run.

In the case of embodiments with two driven endless elements, each of the substantially linear runs may be supported by respective groups of wheels, preferably with the axes of the wheels in one of the groups alternating in the direction of movement of the cable with the axes of the wheels of the other group. Also, the wheels may be arranged in side-by-side pairs with the wheels of each pair on either side of the cable path.

BRIEF DESCRIPTION OF THE DRAWINGS

The invention will be further described, by way of example, with reference to the accompanying drawings, wherein.

DETAILED DESCRIPTION OF THE INVENTION

Figure 1:
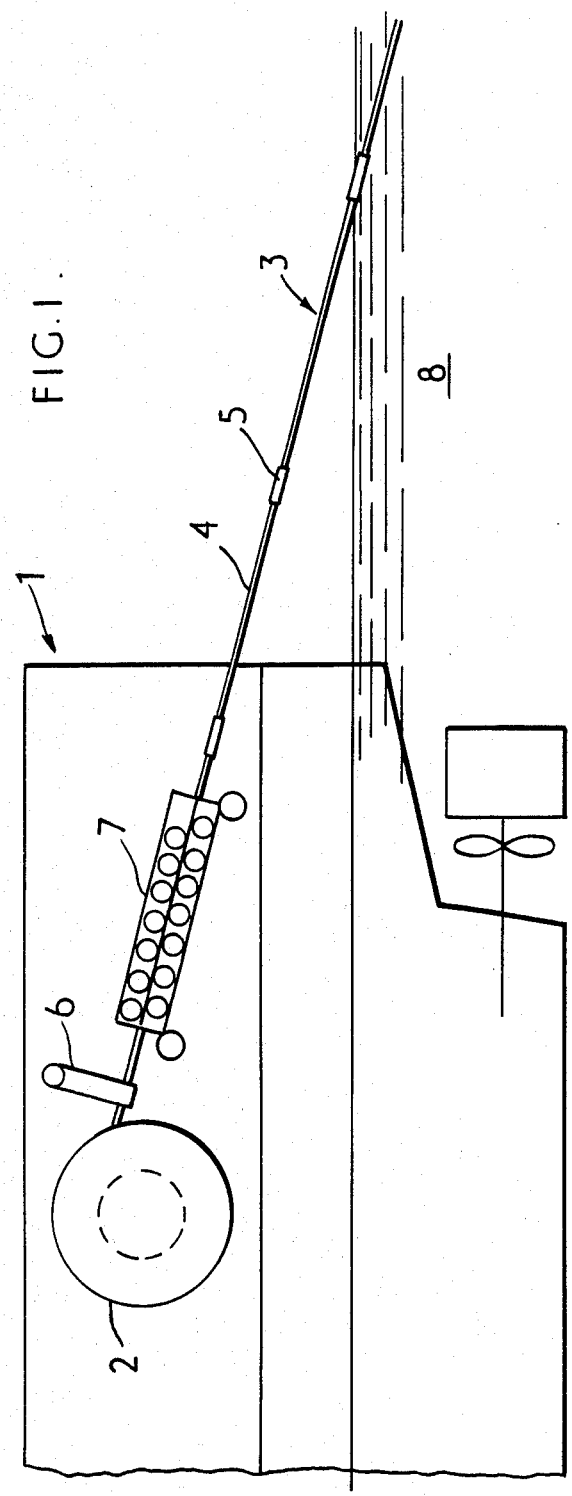
FIG. 1 is a diagram illustrating an installation on board ship for handling a streamer and including an apparatus constituting a preferred embodiment of the invention.
Figure 2:
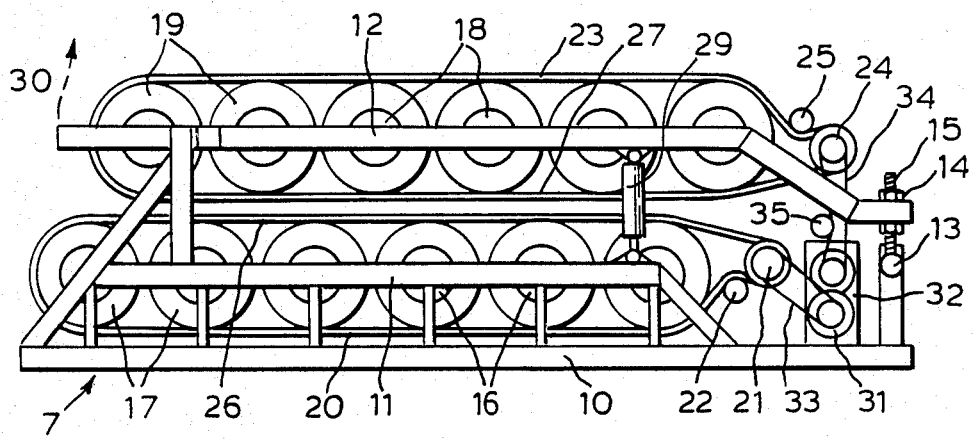
FIG. 2 is a side elevational view of the apparatus of FIG. 1.

FIG. 1 shows the stern part of a seismic survey ship 1 on which is mounted a winch 2 for a streamer 3 which comprises a plurality of cable sections 4 joined together by canisters 5 containing signal processing electronics. The winch 2 is provided with an automatic spooling device 6 for correctly layering the streamer 3 when it is being wound onto the winch 2. An apparatus 7 is disposed between the winch 2 and the stern of the ship 1 and drives the streamer 3 along a substantially linear path towards the winch 2 when the streamer 3 is being removed from the sea 8 and stored on the winch 2.

The apparatus 7 comprises a base 10 on which is mounted a fixed frame 11 and a movable frame 12. The movable frame 12 is pivoted about a horizontal axis 13. The height of the frame 12 relative to the frame 11 can be adjusted by means of a collar 14 threaded to an upright support 15.

Figure 3:
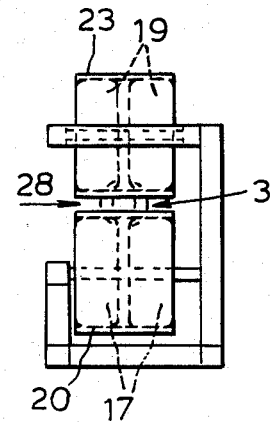
FIG. 3 is a left end view of the apparatus of FIG. 2.

The fixed frame 11 rotatably supports a plurality of wheels 16 provided with pneumatic tires 17. The wheels and tires are arranged in side-by-side pairs as shown in FIG. 3. Similarly, the frame 12 rotatably supports a plurality of wheels 18 provided with pneumatic tyres 19 and arranged in side-by-side pairs. A flexible endless belt 20, made of rubber or polyurethane for example, passes around the tires 17 and around a drive wheel 21. A tensioning wheel 22 is provided so as to maintain a suitable tension in the belt 20. Similarly a flexible endless belt 23 passes around the tires 19 and is provided with a drive wheel 24 and a tensioning wheel 25. The belts 20 and 23 each have substantially linear runs 26 and 27, respectively, which face each other and define therebetween a space for receiving a streamer, which may be inserted in the direction of arrow 28. During winding, the streamer 3 is located at the position shown in FIG. 3 extending in a plane which longitudinally bisects the pairs of wheels 16 and 18. In the longitudinal direction of the streamer, the wheels 16 of the fixed frame 11 alternate in position with the wheels 18 of the frame 12 to ensure maximum frictional contact on the streamer.

A double-acting hydraulic or pneumatic piston and cylinder 29 acts between the frames 11 and 12 to swing the frame 12 upwardly as indicated at 30 for insertion of a streamer and to close the frames and apply a predetermined closing force on the streamer to ensure a sufficient frictional contact with the substantially linear belt runs 26 and 27 for driving the streamer.

A motor 31 and transmission 32 drive the wheel 21 by means of a belt or chain 33. The motor 31 and the transmission 32 also drive the wheel 24 by means of another belt or chain 34 with sufficient slack to allow for the pivoting of the frame 12 and provided with a tensioning wheel 35 to maintain the belt or chain taut.

Figure 4:
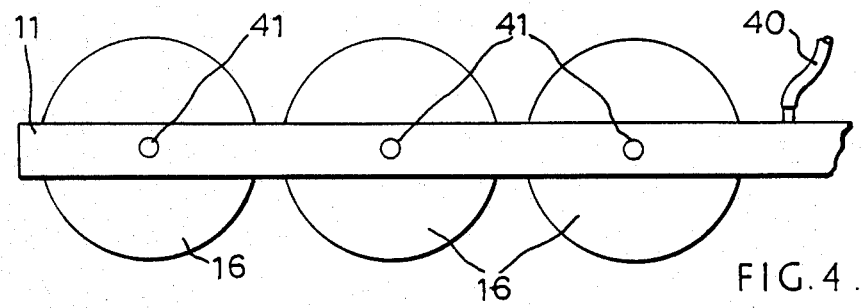
FIG. 4 is an elevational view which illustrates a detail of the apparatus of FIG. 2.

FIG. 4 illustrates three of the wheels 16 with tires 17 thereon mounted on the frame 11. The frame 11 acts as a common manifold connected to a source of compressed air by a tube 40. Each of the wheels 16 has passageways connecting the interior of the pneumatic tire to a hollow shaft 41 rotatably mounted on the frame 11 by slip O-ring means. Thus, the interiors of all of the pneumatic tires communicate with the common manifold provided by the frame 11. A similar arrangement is provided for the frame 12, the wheels 18 and the tires 19.

In order to perform seismic surveying of the seabed and its substrata, the streamer 3 is unwound from the winch 2 and is lowered into the sea 8 off the stern of the ship 1. The streamer is towed during surveying in order to keep it substantially straight so that the positions of hydrophones disposed along the length of the streamer are known. When a survey has been completed, the streamer is inserted into the space between the substantially linear belt runs 26 and 27 in the direction of the arrow 28 so as to occupy the position shown in FIG. 3. The piston and cylinder 29 then closes the frame 12 and applies closing pressure so that the belt runs 26 and 27 are in sufficient frictional contact with the streamer to pull it out of the sea without slippage. The tires 17 and 19 are inflated to a predetermined pressure by the supply tube 40.

The winch 2 includes an hydraulic motor with a full-flow bypass system forming part of a cable tension control system. The tension control is set to provide a predetermined maximum pull, for instance of 200 kg. The actual tension preset by the system is that which is required for effective automatic spooling of the cable onto the winch storage drum. Thus, the part of the streamer between the apparatus and the winch 2 is maintained at a substantially constant tension.

When it is desired to haul in the streamer 3, the apparatus 7 is switched on by energizing the motor 31 which drives both belts 20 and 23. The streamer follows a substantially linear path through the apparatus 7 and the apparatus is arranged so that no bends or kinks are created in the streamer 3 while it is being recovered from the sea. Thus, the danger of bending damage to the streamer is minimized. The streamer is stored in layers on the winch drum at the predetermined constant tension thus minimized the damge of crushing damage. As each canister 5 passes into the apparatus 7, air is displaced from the tyres 17 and 19 in contact with it and flows into the common manifold so that a substantially even pressure is maintained along the length of the streamer within the apparatus. Thus, variations in the diameter of the streamer are accommodated by the apparatus 7. Hauling in of the streamer 3 is controlled entirely by the apparatus 7, since the winch 2 operates continuously to maintain the predetermined tension in the part of the streamer being wound onto the winch drum.

The apparatus 7 may be fixed in position between the winch 2 and the stern of the ship 1 or may be provided with means for sliding it into position so that it may be used only during winding of the streamer onto the winch. However, by making the motor 31 or the transmission 32 reversible, the apparatus 7 could be used also during unwinding and deployment of the streamer 3 to relieve the winch 2 of the tension in the streamer during deployment and towing. In this case, the winch 2 may be operated so as to ensure a predetermined tension in the streamer between the winch 2 and the apparatus 7 so as to provide for tidy unwinding of the streamer from the winch.

As the cable passes through the apparatus 7, it is located centrally between two pairs of the wheels 16 and tires 17 and the wheels 18 and tires 19 as illustrated in FIG. 3, this arrangement forming a natural enclosure for the cable.

In an alternative embodiment, the belts 20 and 23 are dispensed with and the wheels 16 and 18 are driven with the tires 17 and 19 transmitting the drive directly to the streamer 3. Also, the common manifold arrangement for the tires may be replaced with other means for accommodating varying diameters of the streamer. For example, the pairs of wheels may be mounted on suspension means for allowing the wheels to be displaced away from the path of the streamer, possibly with means for providing a constant force toward the path. In the case of streamers or cables where the variations in cross-sectional size are relatively small, it may be possible to dispense with arrangements particularly intended to accommodate varying diameters and to rely instead on the natural properties of a pneumatic tire to accommodate irregularities.

We claim:

1. A cable handling apparatus for use with a winch, said apparatus comprising:
    first and second driven endless elements having first and second linear runs, respectively, for entraining the cable between said runs along a linear path;
    first and second groups of wheels within said first and second driven endless element, respectively;
    first and second groups of pneumatic tires mounted on said first and second groups of wheels, respectively, and engaging said first and second linear runs, respectively;
    a common manifold having means for connection to a source of compressed air; and
    duct means connecting said common manifold to said pneumatic tires so that said pneumatic tires communicate directly with said common manifold.

2. An apparatus as claimed in claim 1, wherein:
    said wheels of said first and second groups of wheels have axes of rotation displaced laterally from said linear runs and lying in first and second groups of planes respectively extending substantially perpendicular to said linear runs, and said planes of said first and second groups of planes are alternately disposed with respect to each other longitudinally along said linear runs.

3. The apparatus as claimed in claim 2 wherein:
each respective group of wheels comprises a plurality of pairs or wheels;
said axes of the wheels of each pair are substantially colinear; and
the wheels of each pair are spaced with respect to each other and disposed on opposite sides of said linear path of the cable.

4. The apparatus as claimed in claim 3 and further comprising;
a base;
a fixed frame mounted on said base;
said first group of wheels being rotatably mounted on said fixed frame in longitudinal spaced relationship;
a movable frame pivotally mounted on said base;
said second group of wheels being rotatably mounted on said movable frame in longitudinal spaced relationship; and
adjusting means mounted between said frames for moving said movable frame with respect to said fixed frame for urging said groups of wheels and tires selectively toward and away from each other.

5. The apparatus as claimed in claim 4 and further comprising:
drive means mounted on said base and operatively connected to said endless elements for driving said endless elements.

6. The apparatus as claimed in claim 5 wherein:
said adjusting means comprises a double acting piston and cylinder means.

7. An apparatus as claimed in claim 1 and further comprising in combination with said apparatus:
a winch for connection to the cable displaced from one end of said linear runs; and
means operatively associated with said winch for maintaining constant tension in the cable during winding of the cable onto said winch.

8. An apparatus as claimed in claim 1 and further comprising:
means for urging said first and second linear runs towards each other.

9. The apparatus as claimed in claim 1 and further comprising:
a base;
a fixed frame mounted on said base;
said first group of wheels being rotatably mounted on said fixed frame in longitudinal spaced relationship;
a movable frame pivotally mounted on said base;
said second group of wheels being rotatably mounted on said movable frame in longitudinal spaced relationship; and
adjusting means mounted between said frames for moving said movable frame with respect to said fixed frame for urging said groups of wheels and tires selectively toward and away from each other.

10. The apparatus as claimed in claim 1 and further comprising:
drive means operatively connected to said endless elements for driving said endless elements.

11. A cable handling apparatus for use with a winch, said apparatus comprising:
first and second groups of driven wheels rotatably mounted on substantially opposite sides of said cable;
first and second groups of pneumatic tires mounted on said first and second groups of wheels, respectively, for entraining the cable between said tires along a linear path;
a common manifold having means for connection to a source of compressed air; and
duct means connecting said common manifold to said pneumatic tires so that said pneumatic tires communicate directly with said common manifold.

12. An apparatus as claimed in claim 11, wherein:
said wheels of said first and second groups of wheels have axes of rotation displaced laterally from said linear path of the cable and lying in first and second groups of planes, respectively, extending substantially perpendicular to said linear path of the cable, and said planes of said first and second group of planes are alternately disposed with respect to each other longitudinally along said linear path.

13. An apparatus as claimed in claim 11 and further comprising in combination with said apparatus;
a winch for connection to the cable displaced from one end of said apparatus; and
means operatively associated with said winch for maintaining constant tension in the cable during winding of the cable onto said winch.

14. The apparatus as claimed in claim 11 and further comprising:
a base;
a fixed frame mounted on said base;
said first group of wheels being rotatably mounted on said fixed frame in longitudinal spaced relationship;
a movable frame pivotally mounted on said base;
said second group of wheels being rotatably mounted on said movable frame in longitudinal spaced relationship; and
adjusting means mounted between said frames for moving said movable frame with respect to said fixed frame for urging said groups of wheels and tires selectively toward and away from each other.

15. The apparatus as claimed in claim 11 wherein:
each respective group of wheels comprises a plurality of pairs of wheels;
said axes of the wheels of each pair are substantially colinear; and
the wheels of each pair are spaced with respect to each other and disposed on opposite sides of said linear path of the cable.

16. The apparatus as claimed in claim 15 and further comprising:
a base;
a fixed frame mounted on said base;
said first group of wheels being rotatably mounted on said fixed frame in longitudinal spaced relationship;
a movable frame pivotally mounted on said base;
said second group of wheels being rotatably mounted on said movable frame in longitudinal spaced relationship; and
adjusting means mounted between said frames for moving said movable frame with respect to said fixed frame for urging said groups of wheels and tires selectively toward and away from each other.

17. The apparatus as claimed in claim 16 and further comprising:
drive means mounted on said base and operatively connected to said wheels for driving said wheels.

18. The apparatus as claimed in claim 17 wherein:
said adjusting means comprises a double acting piston and cylinder means.

19. The apparatus as claimed in claim 11 and further comprising:
drive means operatively connected to said wheels for driving said wheels.

* * * * *